Patented Feb. 7, 1939

2,146,126

UNITED STATES PATENT OFFICE 2,146,126

PAINT COMPOSITION

Elbert L. Metcalf, Dallas, Tex., assignor to Jones-Blair Paint & Varnish Company, Dallas, Tex., a corporation of Texas No Drawing. Application June 4, 1936,
Serial No. 83,554

2 Claims. (Cl. 134—50)

This invention relates to new and useful improvements in paint compositions.

One object of the invention is to provide an improved casein type paint, commonly known as cold water paste paint.

Casein type paint is primarily an interior wall finish and is sold in paste form, being thinned, with water or other liquid by the consumer, to a brushing consistency. Due to the particular properties of the casein, it has been found that it is rather difficult to maintain the mixture in a paste form.

Heretofore, it has been the practice in the manufacture of this type paint to employ an acid solubilizing agent, such as sodium fluoride, for the casein binder. To employ an acid solubilizing agent, it is necessary that the temperature of the agent be controlled. Also, when such agent is used, it is essential in order to maintain the mixture in paste form, to carefully control the pH value, and this is done by adding an alkaline solubilizing agent of casein, such as borax. It is not possible to use one or the other of solubilizing agents, either the acid or the alkaline, alone but to obtain the proper mixture having a paste consistency which will be maintained in storage, it is necessary to employ both.

The use of the acid solubilizing agent is undesirable because it must be heated, its temperature must be properly controlled and it is generally difficult to handle. Therefore, it is one of the important objects of the invention to provide a casein type paint, wherein no acid solubilizing agent is employed in its manufacture.

Another object of the invention is to provide an improved paint, as above described which is manufactured with colloidal clay, whereby the composition will retain its paste consistency under all conditions.

A further object of the invention is to provide an improved cold water paste paint which when thinned with water, produces a composition having all the characteristic properties of an oil paint, plus exceptional covering and spreading qualities.

Still another object of the invention is to provide an improved cold water paste paint which may be manufactured without steam baths, water bath, or other heating methods ordinarily necessary to bring about solution, whereby the cost of manufacture is materially reduced.

The invention will be best understood by reference to the following description, but it is to be clearly understood that the invention is not to be limited to the particular proportions designated for these proportions are subject to variation.

In the manufacture of my improved paste, two basic solutions are employed. The first solution consists of a water absorbent colloidal clay, suspended in water. This clay, such as "bentonite" may be purchased on the open market and due to its properties does not dissolve in water but remains in colloidal suspension therein.

After this first solution has been completed, a second solution is formed in a separate container. This second solution preferably consists of casein, an alkaline solubilizing agent, such as borax, and ammonia, or an ammonium salt, all of which are dissolved in water. The borax is, of course, an alkaline solubilizing agent and any substance having similar properties may be substituted therefor. The ammonia, or ammonium salt, is also an alkaline solubilizing agent and it has been found that the use of ammonia increases the basicity of the mixture. It is noted, however, that, if desired, the ammonia could be eliminated entirely and the amount of borax increased proportionately thereto and a good mixture would be had. The second solution is then added to the first solution by slowly pouring the same into said first solution while stirring or agitating the latter.

After the two basic solutions are admixed, the proportions by weight in the mixture are approximately as follows: water 78.5 parts, casein 16 parts, borax 2 parts, ammonia .5 part and colloidal clay 3 parts. It has been found that the above proportions produce the most desirable composition, but it would be possible to vary the proportions through a comparatively wide range and still produce an effective composition. Although it is best to pour the second solution, which contains the casein, into the first solution, containing the colloidal clay, it might be possible to reverse the operation and pour the latter solution into the former. However, it has been found that when this is done, the clay in colloidal suspension is disturbed, which results in a thin, unstable mixture.

It is noted that only an alkaline solubilizing agent such as borax is employed, and therefore, it is possible to make the solution with cold water and with an ordinary type agitator, thereby eliminating the use of steam or water baths or other methods of heating necessary to bring about solution when acid solubilizing agents are employed. The mixing of the clay in suspension in water with the casein solution, a paint having a paste consistency is produced.

After the two basic solutions have been admixed, such mixture is then ready to be pigmented. Any of the usual paint pigments, such as lithopone, zinc oxide, asbestine, etc., may be used. It has been found that best results are obtained with a combination of 40 to 45 per cent of the casein-bentonite solution and 55 to 60% pigment, by weight. These proportions are, of course, subject to variation and may be varied within reasonable limits. Any suitable preservative, such as salicylic acid, benzoate of soda, etc., may then be added to prevent bacterial decomposition of the casein in the mixture. The amount of preservative used would be very small, probably 18 ounces to each 100 gallons of the composition.

If a more elastic film is desired, a drying or semi-drying vegetable oil may be emulsified into the completed composition. The oil introduced would be approximately 2% by weight of the entire composition and gives a sheen similar to an oil type flat paint when the paint is spread on a surface. It is noted that the vegetable oil is not essential and could, if desired be eliminated.

What I claim and desire to secure by Letters Patent, is:

1. The process of forming a dilutable paste form cold water paint which includes, forming a solution of water with colloidal clay suspended therein, then forming a second solution consisting of casein and an alkaline solubilizing agent, admixing the two solutions, and then adding pigment to the mixture in the substantial proportion of 55 to 60 per cent pigment and 40 to 45 per cent of the basic solution mixture.

2. The process of forming a dilutable paste form cold water paint which includes, forming a basic mixture of a solution of water with colloidal clay suspended therein, and a second solution consisting of casein and an alkaline solubilizing agent, admixing the two solutions to provide the mixture, the proportions of the mixture by weight being approximately 78.5 parts water, 3 parts colloidal clay, 16 parts casein and 2.5 parts alkaline solubilizing agent, and then adding a pigment to the mixture in the substantial proportion of 55 to 60 per cent of pigment and 40 to 45 per cent of said basic solution mixture.

ELBERT L. METCALF.